United States Patent [19]

Wehrmann

[11] 3,860,768

[45] Jan. 14, 1975

[54] ECHO COMPENSATION CIRCUIT TO ERASE ECHOES IN TELEPHONE CIRCUITS

[76] Inventor: Rolf Wehrmann, Rheinbabenallee 1, Berlin, Germany

[22] Filed: Mar. 5, 1973

[21] Appl. No.: 338,169

Related U.S. Application Data

[63] Continuation-in-part of Ser. No. 122,448, March 9, 1971.

[30] Foreign Application Priority Data

Mar. 12, 1970 Germany ............................ 2011669

[52] U.S. Cl. ........................................ 179/170.2
[51] Int. Cl. ........................................ H04m 9/08
[58] Field of Search ...................... 179/170.2, 170.8

[56] References Cited

UNITED STATES PATENTS

| | | | |
|---|---|---|---|
| 3,500,000 | 3/1970 | Kelly, Jr. et al. | 179/170.2 |
| 3,535,473 | 10/1970 | Flanagan et al. | 179/170.2 |
| 3,597,541 | 8/1971 | Proakis et al. | 179/170.2 |
| 3,660,619 | 4/1972 | Chiba et al. | 179/170.2 |

*Primary Examiner*—Kathleen H. Claffy
*Assistant Examiner*—Mitchell Saffian
*Attorney, Agent, or Firm*—Hill, Gross, Simpson, Van Santen, Steadman, Chiara & Simpson

[57] ABSTRACT

An echo compensation circuit for telephone connections by way of two-wire-four-wire circuits, where the echo is eliminated by superposing at 180° out of phase signal derived with the aid of a transversal filter from the speech signal which generates the echo, the transversal filter being preceded by a number $k$ of simple delay members with delay times $\tau$ for compensation of the basic transmission $k \times \tau$ of the echo path, the transversal filter being reduced by the same number $k$ of coefficient members which partially degrade the transmission function of the circuit.

1 Claim, 7 Drawing Figures

INVENTOR
Rolf Wehrmann

BY
Hill, Sherman, Meroni, Gross & Simpson
ATTORNEYS

INVENTOR
Rolf Wehrmann

BY
Hill, Sherman, Meroni, Gross & Simpson
ATTORNEYS

ECHO COMPENSATION CIRCUIT TO ERASE ECHOES IN TELEPHONE CIRCUITS

CROSS REFERENCE TO RELATED APPLICATION

This application is a continuation-in-part of my earlier application, Ser. No. 122,448, filed March 9, 1971.

BACKGROUND OF THE INVENTION

1. Field of the Invention

This invention relates to an echo compensation circuit for telephone connections via two-wire-four-wire circuits wherein the echo is eliminated by superposing a 180° out of phase signal derived from the speech signal generating the echo through means of a transversal filter.

2. Description of the Prior Art

Circuits for preventing echoes in telephone circuits are generally designated in the art as echo compensators; through such compensators an image of the echo — hereinafter called compensation echo — is generated and subtracted from the echo in the telephone circuit.

Echoes can considerably disturb the flow of conversations in long distance telephone connections (for example in trans-Atlantic cable or satellite connections). These echoes are generated principally at the hybrid circuits which are always present in distant connections to form the transfer between two and four wire telephone circuits.

SUMMARY OF THE INVENTION

The present invention is based on the problem of compensating echoes by providing that a transversal filter is preceded in circuit by a number $k$ of single delay members with a delay time $\tau$ for compensation of the basic transmission time $k \times \tau$ of the echo path and that the transversal filter is reduced by the same number $k$ of coefficient numbers which partially degrade the transmission function of the filter.

The invention also provides the sharing of centralized common control components by a number of echo compensation circuits.

BRIEF DESCRIPTION OF THE DRAWINGS

The solution for the foregoing problem will be best understood from the following detailed description taken in conjunction with the accompanying drawings in which.

DESCRIPTION OF THE PREFERRED EMBODIMENTS

Figure 1:
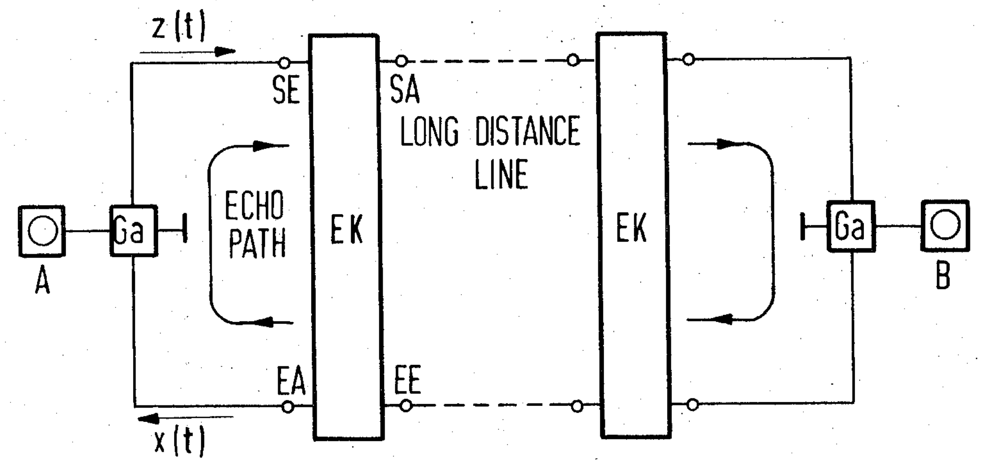
FIG. 1 is a schematic diagram of a long distance telephone connection between two subscribers via a pair of two-wire circuits and an intermediate four-wire circuit.

FIG. 1 illustrates the generally known principal of a long distance connection between two subscribers A and B who are connected by way of two, two-wire connections and an intermediate four-wire long distance connection. Because of the always present maladjustment or mismatching between the two-wire line resistance and its reproduction in the branch circuit or four-wire terminating hybrid Ga, part of the speech signal $x(t)$ arriving at the receiving circuit of the four-wire circuit of the distant subscriber has applied thereto an echo $Z(t)$ via the four-wire terminating set into the transmission path of the four-wire circuit and thus back to the distant subscriber.

Differential echo blocks are utilized to suppress the echo, whose effect, as is known, is based on the fact that as a function of the level of the speech signal, attenuation members are inserted into the echo circuit and the receiving end transmitting path which suppress the echo. The connecting and disconnecting of the attenuation members, however, causes disturbances in the flow of the communication. Consequently, echo suppression circuits were developed, as they are described, for example, in the British Pat. No. 1,093,965.

The echo compensation EK represented in FIG. 1 are accommodated, like in the differential echo black, at central locations in the principal international exchange. These compensators have four connections, mainly the receiving direction input EE and/or the receiving direction output EA and the transmission direction input SE and/or the transmission direction output SA. The echo path, whose length is equal to twice the distance between the point of the connection of the echo compensator and the four-wire terminating set located at the same or at another location is placed between the receiving direction output EA and the transmission direction output SA. This distance varies from one connection to another and may vary between zero or a few kilometers and several hundred kilometers.

The echo $z(t)$ at the transmission direction input SE of the echo compensation can be determined by "folding" the speech signal $x(t)$ of the distant subscriber with the impulse response $h(t)$ of the echo path in accordance with the equation $$z(t) = \int_0^t x(t-\tau)h(\tau)d\tau \qquad (1)$$

which defines the folding operation convolution. By representing the time functions $x(t)$ and $h(t)$ as sequences of impulses of duration $\tau$, the following approximation applies $$z(t) \approx \sum_{i=0}^{N} \tau x(t-i\tau)h(i\tau) \qquad (2)$$

whereby N is an integer whose size is a function of the impulse response of the echo path.

Equation (2) is the foundation for the manner of effect of the echo compensators whose principal is based on reproducing the transmission function of the echo path identified by the impulse response with the aid of an appropriate circuit. By conducting the speech signal $x(t)$ through this circuit, the compensation echo $z_k(t)$ appears at its output, which resembles the actual echo $z(t)$; the better that the echo suppressor reproduces the transmission function of the echo path the better the compensation will be.

Figure 2:
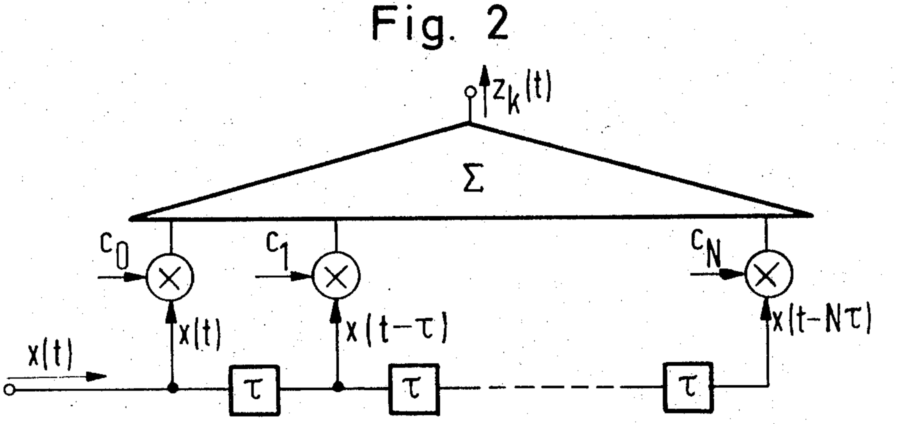
FIG. 2 is a schematic diagram of a transversal filter known per se in the prior art.

The principal ingredient of the echo compenator is a transversal filter which is known per se in the art and illustrated in FIG. 2. The transversal filter comprises a number N of delay members having a delay time $\tau$, (N+1) coefficient members $c_0, c_1 \ldots c_N$ to evaluate the tapped voltages at the delay members and an adding circuit $\Sigma$ which is effective to add the evaluated tapped voltages. By applying a voltage $x(t)$ to the input of the transversal filter, the output signal is provided in accordance with the expression $$z_k(t) = \sum_{i=0}^{N} c_i x(t - i\tau). \qquad (3)$$

A comparison between equations (2) and (3) shows that the transversal filter is able to derive the compensation echo $z_k(t)$ from the speech signal $x(t)$, when it is possible to provide the coefficients $c_i = \tau\, h(i\tau)$. Inasmuch as the impulse response of the echo path may vary with each telephone connection, the coefficients $c_i$ must be redetermined and readjusted with each selected or dialed connection. There are two methods to determine the coefficients $c_i$ which will be explained below in greater detail by means of the basic drawings according to FIGS. 3 and 4.

Figure 3:
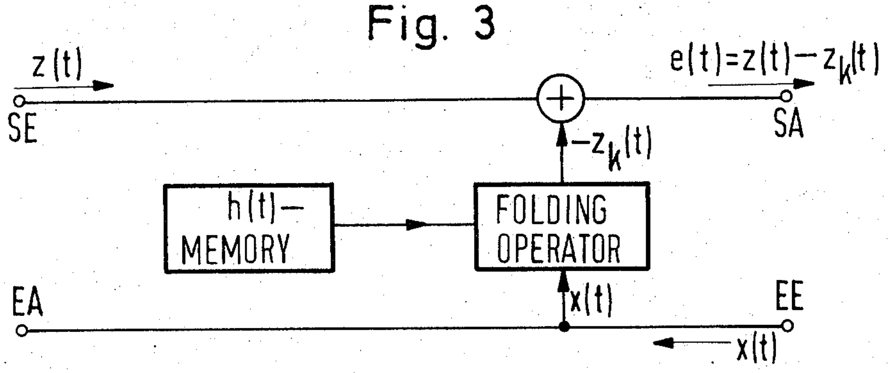
FIG. 3 illustrates an echo compensator which utilizes a transversal filter and a memory for storing the impulse response of the echo path prior to conversation over the circuit.

In the echo compensator according to FIG. 3, the impulse response $h(t)$ of the echo path is measured prior to the start of the conversation and recorded in a memory for the function $h(t)$. The speech signal $x(t)$ passes through the folding operator representing basically a transversal filter, in which the speech signal $x(t)$ is folded with the function $h(t)$ according to equation (2) and/or (3). After multiplication by the factor $-1$, there appears at the output of the folding operator the negative compensation echo $-z_k(t)$, which is superposed over the echo $z(t)$ by way of an adding stage.

Figures 4, 5, 6:
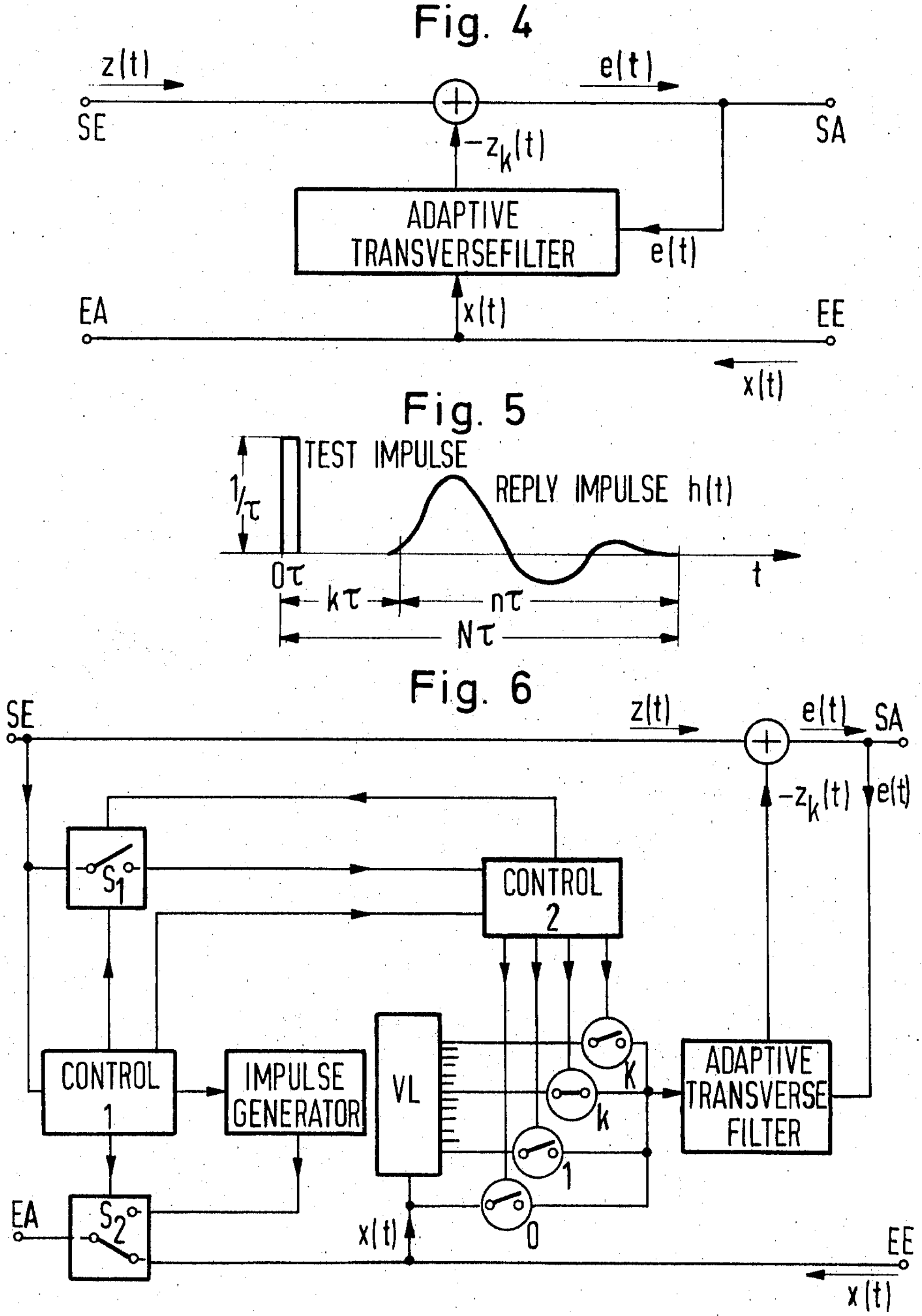
FIG. 4 illustrates another embodiment of an echo compensation circuit which utilizes a transversal filter.
FIG. 5 is a graphical illustration of the behavior of a pulse and the impulse response of an echo path.
FIG. 6 is a schematic diagram of an echo compensation circuit which utilizes a transversal filter and a delay line connected in circuit for echo compensation.

FIG. 4 illustrates the application of the second possibility to form the compensation echo. The speech signal $x(t)$ passes here through a transversal filter, whoe coefficients $c_i$, however, in contrast to the method according to FIG. 3, are determined by a cross-correlation analysis between the tapped voltages of the transversal filter and the residual echo $e(t) = z(t) - z_k(t)$ at the output of the direction of transmission SA of the echo compensator.

The coefficient members to determine the coefficients $c_i$ and to form the product $c_i \times x\ (t - i\ \tau)$ are very expensive to obtain technically and economically, in both methods which respectively concern the folding operator technique and cross-correlation analysis. They must be present in each case (N+1) times for the (N+1) tappings of the transversal filters.

The invention, as mentioned above, is based on the problem of providing echo compensation by providing that the transversal filter is preceded by a number $k$ of simple delay members with a delay time $\tau$ for compensation of the basic travel time $k \times \tau$ of the echo path and that the transversal filter is reduced by the same number $k$ of technically and economically more expensive coefficient members which partially degrade the transmission function of the filter.

FIG. 5 illustrates an embodiment of the course of an impulse response of an echo path, when at time $t = O$ a testing impulse is connected to the receiving direction output EA of the echo compensator. The impulse response measured at the transmission direction input SE is presumed to have receded during the time $t = N\tau$ after transmission of the testing impulse. As illustrated in FIG. 5, the time $N\tau$ can be divided into two sections. During the first section $t_1 > k\tau$ the amplitude of the impulse response $h(t)$ equals zero and/or is smaller than the evaluation threshold $h_s$ introduced for filtering out the interference noise. During the second period $t_2 = n\tau$, the pulse response $h(t)$ shall be $h_s$.

If this impulse value shall be reproduced by a transversal filter, the first $k$ coefficients $c_0$, $c_1$ to $c_{k-1}$, determining the amplitude during the basic transit time $k$, $\tau$ must be equal to O. The first $k$ tappings of the transverse filter thus deliver nothing to the compensation echo according to equation (3), the corresponding coefficient members may therefore be eliminated since they negatively influence the transmission function of the filter and can even degrade the transmission function. To reproduce the wave form of the impulse response during the second section $t_2 = n\tau$ only $(n+1)$ coefficient members $c_k$, $c_{k+}$ to $c_N$ are needed. The N- membered transversal filters with (N+1) coefficient members can therefore be replaced by a transversal filter comprising only $n = N - k$ delay members and $(n+1)$ coefficient members, preceded by a $k$-membered transit time chain. In this way it is possible to save $k$ of the expensive coefficient members.

The impulse response and, thus, the duration $k\tau$ of the basic transit time from connection to connection generally differs. $N_{max}\,\tau$ should be the maximum possible length of the impulse responses of all echo paths and $n_{max}\,\tau$ should be the maximum possible time during which the amplitude of the impulse response is larger than the above mentioned threshold $h_s$. Then the transversal filters of the known echo compensators must contain, according to FIGS. 3 and 4, $N_{max}$ delay and $(N_{max} + 1)$ coefficient members. According to the invention, $K = N_{max} - n_{max}$ coefficient members are saved by providing a K-membered delay line whose members precede the transversal filter. At a certain connection with the basic transit time $k\tau$, $k < K$ members of the delay line must precede the transversal filter.

In order to determine the number of $k$ delay members the basic transit time $k\tau$ of the echo path must be measured. This can be done during the time between the conclusion of the establishing of the connection and the start of the conversation. For example, by evaluation of the station identification signal a test impulse can be transmitted into the echo path and with the aid of a pulse counter at the transmission direction input SE of the echo compensator the time can be measured until the amplitude of the impulse response reaches the threshold $h_s$. For further savings of technical apparatus and time it is expedient to centralize the time measuring the connection apparatus, that is to provide for a group of echo compensators only once as the time during which this circuit is needed is very short in comparison to the average on time of the echo compensators which is equal to the average duration of a conversation.

FIG. 6 illustrates an embodiment of the invention for a circuit to measure the basic transit time $k\tau$ of the echo path and to conect $k$ members of a K membered delay line ahead of the transversal filter, represented for the echo compensator according to FIG. 4, but also applicable analogously to the echo compensator according to FIG. 3. The circuit contains the following components: a control 1 to reevaluate the identification signal occurring in the transmission path of the four-wire circuit, indicating the completion of the telephone connection; a pair of switches $S_1$ and $S_2$ operated by the control 1 for a certain time; an impulse generator induced by the control 1 to transmit a test impulse into the echo path; a control 2 with an apparatus to scan the amplitude value $h(i\tau)$ of the impulse reply at times $i\tau$ ($i = 0.1 \ldots . k$), a circuit to compare the scanning values $h(t\tau)$ with a predetermined threshold value $h_s$ and a pulse counter by which the time is measured during the basic running time of the impulse response. The circuit according to FIG. 6 also contains a delay line VL with K delay members of a delay time $\tau$ and finally a connecting feedback field of (K + 1) switches 0.1 . . . K to connect a number of delay members to the echo compensator determined by the position of the pulse counter in the control 2.

The method of operation of the apparatus is described below. As soon as the control 1 receives the identification signal showing the completion of a connection, it induces the following operations: delivery of an additional impulse to the control 2, by which the pulse counter is set to 0, switches 1 – K are opened and the switch 0 is closed; operation of the swithes $S_1$ and $S_2$ and delivery of one control impulse each to the impulse generator to transmit a test impulse and to control 2 to start the scanner and the pulse counter. If the amplitude of the impulse response at the time of scanning already exceeds the threshold $h_s$ (a very short echo path), the pulse counter is at once shut off and the switch 0 remains closed. If $h(0) < h_s$, the switch 1, which is part of the connecting feedback field is closed, and the switch 0 is opened. After $\tau$ seconds the next scanning takes place. If here too $h(\tau) < h_s$, the switch 2 is closed and the switch 1 is opened, etc. until at the scanning time $k\ \tau$ the amplitude of the impulse response is $h\ (k\ \tau)$ $h_s$. Then the pulse counter is disconnected and the switch $k$ of the connecting feedback field remains closed, while all remaining K switches are open. Now the transversal filter $k$ is preceded by $k$ members of the delay line. The control 2 causes the switch $S_1$ to return to its resting position. The switch $S_2$ can be returned earlier, namely immediately after transmission of the test impulse.

A conversation signal $x(t)$ arriving at the receiving direction input EE of the echo compensator is now predelayed in the delay line VL by the basic transit time $k\tau$ before reaching the input of the $n$-membered transversal filter with ($n$ + 1) adjustable coefficient members, whose setting can be accomplished in the known manner according to FIG. 4 or FIG. 5. For the above mentioned centralizing of parts of the time measuring and connecting apparatus, the building components of the control 1 and of the impulse generator, as well as the scanning apparatus and the threshold comparison circuit of the control 2 are appropriate.

Figure 7:
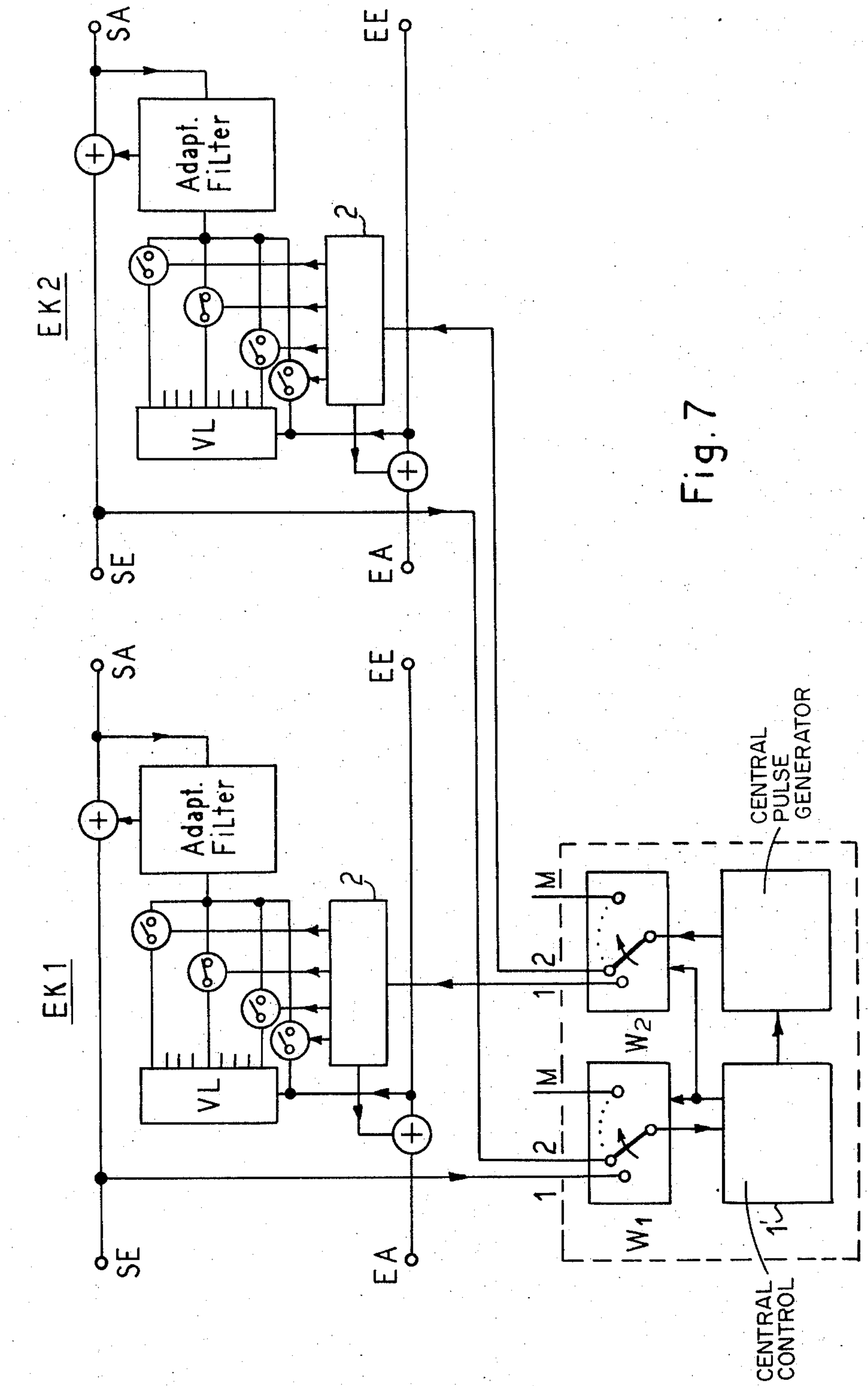
FIG. 7 is a schematic diagram showing the connections for sharing centralized and common control components by a number of echo compensation circuits.

The principle of centralization of structural components for measuring the basic transit time and for the control of the delay members is explained in more detail by means of the arrangement illustrated in FIG. 7. This arrangement constitutes a number M of echo compensation circuits of which, however, only the first two said cicuits EK1 and EK2 are illustrated. Each echo compensation circuit comprises, among other components, a control 2; however, te functions of the control 1 and of the impulse generator according to FIG. 6, are provided centrally by a central control 1′ and a central impulse generator in the arrangement according to FIG. 7.

Subsequently all M echo compensation circuits are connected by way of a pair of synchronously operated electronic selectors $W_1$ and $W_2$ to the central control 1′ and the central impulse generator. In FIG. 7, the compensation circuit EK2 is activated. The central control checks whether a signal occurs at the transmission direction input SE of the activated echo compensation circuit which shows the completion of a connection between subscribers. If there is such a connection, the selectors $W_1$ and $W_2$ are switched off and the central pulse generator is activated. the generator emits pulses at an interval of $\tau$ seconds to the control 2 in the activated echo compensation circuit. Because of the first pulse, the control 2 causes the release of a test pulse into the echo path, the closing of the switch 0 and the opening of switches 1–K. In the central control, the voltage at the transmission direction input SE of the echo compensation circuit is monitored and the time $k\tau$ is determined. At the frequency of the central impulse generator, the control 2 in the echo compensation circuit subsequently operates pairs of switches 0 and 1, 1 and 2 to K–1 and K. After $k\tau$ seconds the switch K is switched through and all other switches are open. Thus, delay members are switched in front of the transversal filter. The central control stops the central impulse generator and causes the continuous switching operation of the selectors $W_1$ and $W_2$. Thereafter, the basic transit time can be measured at the next echo compensation circuit.

The advantages which may be achieved with the invention in particular reside in that in the echo compensators expensive coefficient members are replaced by simple delay members, a number of components of the circuit are centralized and thus needed but once for a plurality of applications, and the transmission functions of the transversal filter are improved. In addition, the overall technical and financial cost for the echo compensation circuits according to the present invention are substantially reduced.

Many changes and modifications may be made in the invention by those skilled in the art without departing from the spirit and scope of the invention, and it is to be understood that I intend to include within the patent warranted hereon all such changes and modifications as may reasonably and properly be included within the scope of my contribution to the art.

What I claim is:

1. In an echo compensation circuit for telephone connections over two wire-four wire cicuits of the type wherein the echo is eliminated by superposing a signal of opposing phase which is derived from the speech signal creating the echo by means of a transverse filter, wherein the transverse filter comprises a number of delay circuits having a delay time $\tau$ and a number of adjustable coefficient members for the tapped voltages of the transverse filter, adjustment being effected by cross-correlation analysis between the tapped voltages of the transverse filter and the remaining echo at the transmission direction output, and wherein a delay line which compensates at least a part of the basic transit time of the echo path can be connected in front of the transverse filter, the improvement therein comprising the provision of said delay line as a number of delay members which in each case have the same delay time $\tau$ as the delay members of the transverse filter, a pulse generator providing a test pulse to the echo path between the output in the receiving direction and the input in the transmitting direction and providing cyclically recurring pulses at intervals $\tau$, timing means connected to the input in the transmitting direction for measuring the time for pulse reply to exceed a predetermined threshold in response to the cyclically recurring pulses, and means connected between said time measuring means and said number of delay line members for connecting a number $k$ of said delay members in front of said transverse filter to simulate the measured transit time, including a first plurality of switches operable in accordance with the echo path transit time by connecting said delay members in circuit ahead of said transverse filter, and a control unit including a second plurality of switchs cooperable with said first plurality of switches to effect said delay member connections, said pulse generator and said timing means and said first plurality of switches and said control unit and its second plurality of switches jointly connectible for serving a number of echo compensation circuits.

* * * * *